United States Patent [19]

Eberts et al.

[11] Patent Number: 5,149,369
[45] Date of Patent: Sep. 22, 1992

[54] BISMUTH OXYCHLORIDE NACREOUS PIGMENT HAVING IMPROVED WEATHER FASTNESS AND THE PRODUCTION THEREOF

[75] Inventors: Robert E. Eberts, Mahopac; Robert M. Juby, II, Cold Spring; Michael T. Venturini, II, Peekskill, all of N.Y.

[73] Assignee: Mearl Corporation, Ossining, N.Y.

[21] Appl. No.: 818,415

[22] Filed: Jan. 6, 1992

Related U.S. Application Data

[63] Continuation of Ser. No. 654,292, Feb. 8, 1991, abandoned.

[51] Int. Cl.$^5$ .................... C09C 1/00; C04B 20/10
[52] U.S. Cl. .................... 106/479; 106/418; 106/419; 106/439
[58] Field of Search ............ 106/418, 419, 439, 479

[56] References Cited

U.S. PATENT DOCUMENTS

| | | | |
|---|---|---|---|
| 3,822,141 | 7/1974 | Kaufman | 106/418 |
| 3,980,491 | 9/1976 | Eberts | 106/418 |
| 4,126,727 | 11/1978 | Kaminski | 427/214 |
| 5,022,923 | 6/1991 | Rau et al. | 106/415 |

FOREIGN PATENT DOCUMENTS

| | | | |
|---|---|---|---|
| 664268 | 6/1963 | Canada | 106/439 |
| 50-034031 | 2/1975 | Japan | 106/439 |
| 299797 | 11/1928 | United Kingdom | 106/439 |
| 969352 | 9/1964 | United Kingdom | 106/439 |

*Primary Examiner*—William R. Dixon, Jr.
*Assistant Examiner*—Scott L. Hertzog
*Attorney, Agent, or Firm*—Ostrolenk, Faber, Gerb & Soffen

[57] ABSTRACT

Bismuth oxychloride nacreous pigment coated with a rare earth metal compound is described. The coated pigment is prepared by adding a rare earth metal salt solution to a suspension of bismuth oxychloride pigment crystals to form a further suspension containing the pigment crystals and cerium hydroxide. The cerium hydroxide is then precipitated out of the further suspension to coat the pigment crystals. The coated pigment is endowed with improved weather fastness.

20 Claims, No Drawings

BISMUTH OXYCHLORIDE NACREOUS PIGMENT HAVING IMPROVED WEATHER FASTNESS AND THE PRODUCTION THEREOF

This is a continuation of application Ser. No. 07/654,292 filed on Feb. 8, 1991 now abandoned.

BACKGROUND OF THE INVENTION

1. Field of the Invention

The present invention relates to pigments and, more particularly, nacreous or pearlescent pigments.

2. Description of the Related Art:

Nacreous or pearlescent pigments are lamellar or plate-like pigments which impart a pearly or nacreous luster to objects on which or in which they are used. Natural pearl essence, a mixture of guanine and hypoxanthine obtained from the scales of fish, has long been used in cosmetic formulations. Synthetic nacreous pigments developed for cosmetic and industrial use include bismuth oxychloride, bismuth oxychloridemica, titania coated mica and lead carbonate.

Bismuth oxychloride is used as a pearlescent pigment in many fields. For example, it is used as a pigment in cosmetics such as nail enamel and lipstick. It is also used as a pigment for plastics and paints It is an inherent characteristic of bismuth oxychloride to lack weather fastness. The term "weather fastness", as used herein, is meant to include weather resistance and light stabilization.

SUMMARY OF THE INVENTION

Accordingly, it is an object of the invention to provide bismuth oxychloride nacreous pigment with improved weather fastness, and a method for producing such pigment.

This objective, and other objectives, are achieved by providing an improved bismuth oxychloride pearlescent pigment which comprises bismuth oxychloride crystals coated with a rare earth metal compound, preferably a rare earth metal hydroxide, most preferably cerium hydroxide The cerium hydroxide coating on the bismuth oxychloride crystals imparts the improved weather fastness qualities thereto.

A method of preparing the improved pearlescent pigment discussed above is also provided. The method includes adding a rare earth metal salt solution to a bismuth oxychloride pigment suspension. Preferably, the rare earth metal salt solution is added to a first aqueous suspension of bismuth oxychloride pigment crystals to form a second suspension containing the pigment crystals and cerium hydroxide. The second suspension is maintained at a pH below the pH at which cerium hydroxide precipitates. The pH of the second suspension is then raised above the precipitation pH to cause the cerium hydroxide to precipitate and coat the bismuth oxychloride pigment crystals. The aqueous bismuth oxychloride pigment suspension is preferably heated prior to the addition thereto of the rare earth metal salt solution, which is preferably a cerium salt solution, most preferably either a cerous chloride solution or cerous nitrate solution.

DESCRIPTION OF THE INVENTION

Bismuth oxychloride nacreous pigment, which is coated with a rare earth metal compound in accordance with the invention, may be prepared in any conventional manner.

One method includes adding a soluble bismuth compound, which may be in solution, and a source of chloride ions to an aqueous acidified reservoir. Any soluble bismuth compound can be used and bismuth nitrate is the compound most often employed. To prevent premature hydrolysis and precipitation of insoluble bismuth compounds, a compatible mineral or other strong acid is added to both the bismuth salt solution and to the reservoir. Hydrochloric acid or a mixture of hydrochloric and nitric acids is convenient since it also serves as a source of the needed chloride ions. Hydrolysis of the bismuth compound is controlled by maintaining the acidity within desired limits by adding base to neutralize acid which forms during the hydrolysis reaction. The base used is conveniently an alkali metal hydroxide; however, other soluble sources of hydroxyl ions such as a strongly basic amine or a base precursor such as urea can also be used.

The pH of the acid reservoir is usually maintained at about 1 during the precipitation.

The temperature at which the preparation of the BiOCl pigment is effected is generally between about 50° and about 100° C., with a temperature range of about 60° to about 80° C. being preferred.

Solutions of the soluble bismuth salt and the base are preferably simultaneously pumped into the acidic reservoir, the amount of bismuth solution being controlled so as to produce a specific pigment crystal size.

If the BiOCl pigment crystals have been freshly prepared in a manner, for example, as discussed above, the resulting pigment slurry may be allowed to settle and supernatant may be withdrawn prior to coating the BiOCl pigment crystals with a rare earth metal compound in accordance with the invention, resulting in an aqueous paste dispersed in water. In any event, to coat BiOCl pigment crystals with the rare earth metal compound, BiOCl pigment slurry is preferably but not necessarily heated, preferably to a temperature between about 35° C. and about 100° C., most preferably to to between about 50° and 80° C., and a rare earth metal salt solution is added thereto to form a dispersion containing the pigment and a rare earth metal compound. The pH of the dispersion is maintained below the precipitation pH of rare earth metal compounds which is about 4, and is preferably maintained below about 1, in any suitable manner. The pH of the dispersion is then raised above the precipitation pH, preferably to about 10, to precipitate the rare earth metal compound and coat it onto the BiOCl crystals. The slurry may then be allowed to cool to room temperature, and the pigment may then be separated (for example by being concentrated), flushed (i.e., transferred into an oil or varnish) and formulated, in any suitable, conventional manner.

In a preferred embodiment of the invention, the rare earth metal salt solution is a cerium salt solution, solutions of cerous chloride or cerous nitrate being preferred. The rare earth metal compound is preferably a rare earth metal hydroxide. If, for example, a cerium salt solution is added to the slurry of BiOCl pigment crystals, the rare earth metal compound cerium hydroxide will be formed in the resulting dispersion, and the cerium hydroxide is precipitated to coat the pigment crystals.

The BiOCl crystals are coated with the rare earth metal compound in an amount of about 1 to about 7.5 wt. %, based upon the total weight of the pigment, preferably about 1 to about 6 wt %.

In order to more fully illustrate the present invention, the following non-limiting examples have been set forth. Unless otherwise indicated, all temperatures are in degrees centigrade and all parts and percentages are by weight throughout this specification and the following claims.

EXAMPLE 1

166 milliliters of concentrated hydrochloric acid were added to a 12 liter demineralized water reservoir, to bring the pH of the reservoir to about 1. The reservoir was then heated to 70° C. 420 milliliters of bismuth feed solution (HCl and bismuth nitrate; 0.2 g Bi/ml) were pumped into the reservoir at a rate of 2.5 ml/min. Simultaneously, 6N sodium hydroxide was pumped into the reservoir at about the same rate. The amount of bismuth nitrate solution added resulted in an average crystal size of 13 micrometers. At this point, 10 grams of cerous chloride were added to the reservoir and the caustic feed was continued until a pH of 8-11 was obtained. The resulting pigment was then isolated by settling and decanting.

A portion of the pigment was then flushed into an organic formulation. The resulting pigment formulation was then dispersed to a 4.0% concentration in a nitrocellulose lacquer to form a lacquer dispersion of the following composition:

| | |
|---|---|
| 15/20 sec. RS nitrocellulose | 2.85% |
| 30/40 sec. RS nitrocellulose | 6.33% |
| IPOH-wet | 4.94% |
| Amyl Acetate H.B. | 43.28% |
| Butyl Carbitol | 3.00% |
| Butyl Acetate | 39.60% |

A "drawdown", a standard technique for evaluating nacreous pigments, was then made by spreading a pool of the lacquer dispersion on a black and white hiding power chart using a Bird Applicator designated as yielding a wet film thickness of 0.003 inch. The card was then allowed to rest in a horizontal position while the solvent evaporated and the film hardened. The pigment treated in accordance with this invention exhibited a pearl/white appearance.

A control run following the above procedure, but without the addition of cerous chloride to the reservoir was performed and a drawdown of the resulting pigment was also made.

The pigments were then evaluated for light stability. The freshly precipitated BiOCl crystals were first concentrated in the aqueous phase by settling and removing the supernatant. The crystals were then flushed into an organic phase which consisted of a ketone ester and aromatic solvents. The crystals were then dispersed in an organic soluble resin and the crystal content was adjusted to 60% by weight. The dispersed crystals were then incorporated into an acrylic-melamine/formaldehyde baking enamel so that the enamel contained 10% crystals by weight of the total resin solids in the enamel. The enamel dispersion was sprayed onto Bonderite 40 treated cold rolled and polished steel panels primed with a low film build cathodic electro-deposition primer. Wet on wet coats were applied so that a dry film thickness of 0.9 mils to 1.1 mils resulted. This was followed by an acrylicmelamine/formaldehyde clear coat of 1.5 to 2.0 mils dry film thickness. The panels were then baked for 30 minutes at 250° F. in a forced air oven.

The baked panels were exposed in Florida, black box 5° south. After 12 months exposure, the darkening of the panels were analyzed by obtaining L values. The control sample had a CIELab$\Delta$L of $-43.4$ as measured on Macbeth Color-Eye 1500. The treated sample had a $\Delta$ L of $-31.1$ and was visibly much less dark than the control. The L value is a measure of the lightness and darkness of a sample. An L value of 0 is white and a value of 100 is black.

Panels as described above were also prepared and exposed in a QUV machine for 8 weeks using UVA-340 bulbs. Upon completion of the test, a significant improvement in light fastness was noticed compared to the control.

EXAMPLE 2

60 grams of sodium chloride were added to a 4.5 liter demineralized water reservoir. At a temperature of 80° C., a bismuth nitrate solution was dumped into the reservoir while the reservoir was being mixed. After 5 minutes, 4.5 grams of cerium chloride heptahydrate were added. The reservoir was then neutralized to a pH of 8.4 and cerium hydroxide coated BiOCl crystals were settled, collected and dispersed into an acrylic formulation. The resulting pigment had good luster and significantly improved weather resistance, compared to the untreated control. This was tested by using the same sample preparation as described in Example 1. The panels were exposed in a QUV machine using a cycle of 8 hours UV at 150° F. followed by 4 hours of humidity at 120° F. for a total of 8 weeks. The improvements were similar to those obtained in Example 1.

EXAMPLE 3

194 milliliters of concentrated hydrochloric acid were added to a 12 liter demineralized water reservoir to bring the pH of the reservoir to about 1. The reservoir which was then heated to 70° C. 460 milliliters of the bismuth feed solution of Example 1 were pumped into the reservoir at a rate of 2.0 ml/min. Simultaneously, 6N sodium hydroxide was pumped into the reservoir at about the same rate. The amount of bismuth solution added resulted in an average crystal size of 3 micrometers. At this point, 3.75 grams of cerium chloride heptahydrate were added to the reservoir and the caustic feed was continued until a pH between 8-11 was obtained. The resulting pigment was then isolated by settling and decanting.

When formulated, sprayed and exposed in a QUV machine for 8 weeks as described in Example 2, the treated pigment had good weather resistance compared to the untreated control.

EXAMPLE 4

A slurry containing precipitated BiOCl crystals was allowed to settle and the supernatant was withdrawn. A 70% aqueous paste resulted 14.3 grams of the paste (10.0 grams of crystals) were dispersed in 1.5 liters of distilled water to form a slurry which was then heated to 70° C. and maintained at this temperature. The pH of the slurry was 6.2. A solution of 1.51 grams of cerium chloride hexahydrate dissolved in 50 milliliters of distilled water was added at a rate of 2 ml/min while maintaining the pH at 6.2 with 2% NaOH. The pH of the slurry was slowly raised to 10.0 by addition of a 2% NaOH solution at a rate of 2 ml/min. and it was allowed to cool to room temperature. The pigment was concentrated by centrifugation and flushed into toluene.

Various changes and modifications can be made in the composition and process of the present invention without departing from the spirit and scope thereof. The embodiments which have been described herein were for the purpose of further illustrating the invention but were not intended to limit it.

What is claimed is:

1. A pearlescent pigment composition, consisting essentially of bismuth oxychloride crystals coated with a cerium compound, the cerium compound being present in an amount effective to improve weather fastness of said pigment.

2. The pearlescent pigment of claim 1, wherein said cerium compound comprises about 1 to about 7.5 wt. % of said pigment, based upon total weight of said pigment.

3. The pearlescent pigment of claim 2, wherein said cerium compound comprises about 1 to about 6 wt. % of said pigment.

4. The pearlescent pigment of claim 1, wherein said cerium compound is metal hydroxide.

5. The pearlescent pigment of claim 4, wherein said cerium hydroxide comprises about 1 to about 7.5 wt. % of said pigment, based upon total weight of said pigment.

6. The pearlescent pigment of claim 5, wherein said cerium hydroxide comprises about 1 to about 6 wt. % of said pigment, based upon total weight of said pigment.

7. A process for preparing a pearlescent pigment composition consisting essentially of bismuth oxychloride pigment crystals and cerium hydroxide compound, said pigment composition having improved weather fastness, the process comprising the step of combining cerium salt solution and a suspension of bismuth oxychloride pigment under conditions such that said bismuth oxychloride pigment crystals are coated with said cerium hydroxide compound.

8. The process of claim 7, wherein said cerium salt is selected from the group consisting of cerous chloride and cerous nitrate.

9. The process of claim 7, wherein said combining step comprises the steps of adding said cerium salt solution to a first suspension of said bismuth oxychloride pigment to form a second suspension containing said bismuth oxychloride pigment and cerium hydroxide while maintaining said second suspension at a pH below the pH at which cerium hydroxide precipitates, and raising the pH of said second suspension above the pH at which cerium hydroxide precipitates to precipitate said cerium hydroxide and to coat said bismuth oxychloride pigment with said cerium hydroxide.

10. The process of claim 9, wherein said first suspension comprises an aqueous suspension of said bismuth oxychloride pigment.

11. The process of claim 9, further comprising the step of heating said first suspension prior to adding said cerium salt solution thereto.

12. The process of claim 11, wherein said heating step comprises heating said first suspension to a temperature of about 70° C.

13. The process of claim 9, wherein said pH maintaining step comprises maintaining said said second suspension at a pH of about 6.2.

14. The process of claim 9, wherein said pH raising step comprises raising the pH of said second suspension to about 10.

15. The process of claim 9, wherein said cerium salt is selected from the group consisting of cerous chloride and cerous nitrate.

16. The process of claim 15, wherein said first suspension comprises an aqueous suspension of said bismuth oxychloride pigment.

17. The process of claim 15, further comprising the step of heating said first suspension prior to adding said cerous chloride solution or said cerous nitrate solution thereto.

18. The process of claim 17, wherein said heating step comprises heating said first suspension to a temperature of about 70° C.

19. The process of claim 15, wherein said pH maintaining step comprises maintaining said second suspension at a pH of about 6.2.

20. The process of claim 15, wherein said pH raising step comprises raising the pH of said second suspension to about 10.

* * * * *